S. W. BALDWIN.
Nut-Locks.
No. 151,743. Patented June 9, 1874.
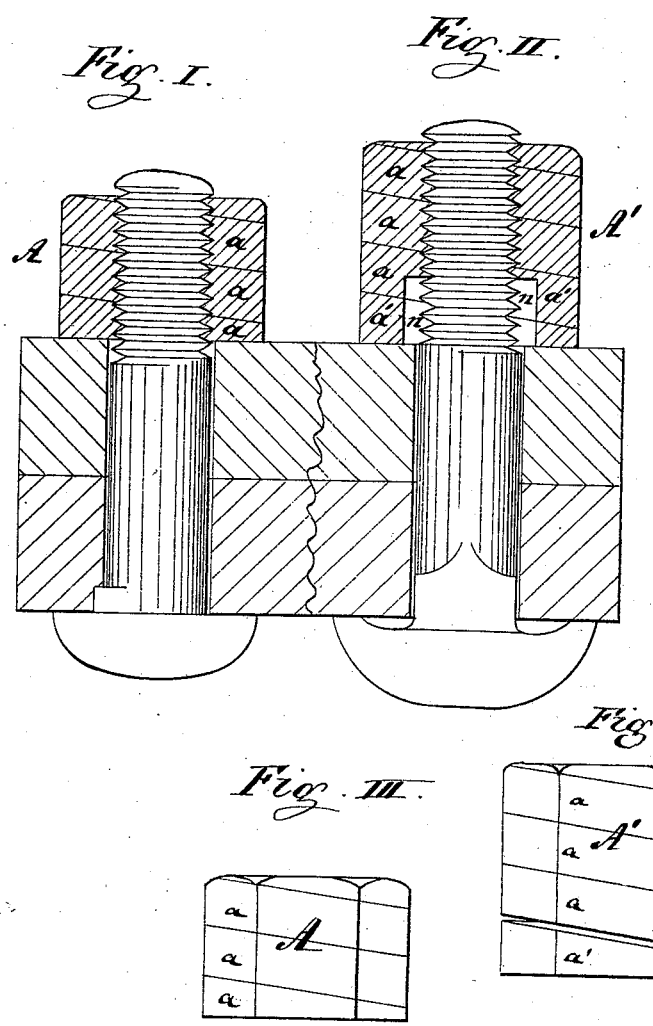

UNITED STATES PATENT OFFICE.

STEPHEN W. BALDWIN, OF YONKERS, NEW YORK.

IMPROVEMENT IN NUT-LOCKS.

Specification forming part of Letters Patent No. 151,743, dated June 9, 1874; application filed October 21, 1873.

*To all whom it may concern:*

Be it known that I, STEPHEN W. BALDWIN, of Yonkers, in the State of New York, have invented a new and Improved Lock-Nut, of which the following is a specification:

The nature of my invention consists in the manufacture of a nut from flat bars, coiled similar to a spring, into which the thread is tapped a little smaller in diameter than the diameter of the bolt, so that when screwed upon the bolt the several coils forming the nut must slightly expand, in consequence of which a firm gripe on the thread is obtained for the whole extent of the nut, preventing thereby the nut from unscrewing; and, further, in the combination of two or more extra coils at the bottom of the nut, forming a continuation of those coils which constitute the nut, and which said extra coils are bored out larger than the outside diameter of the bolt to form a substitute for a spring-washer between the nut and the material.

In the accompanying drawing, Figures I and II represent sections of my improved lock-nuts, embodying my invention. Figs. III and IV are outside views of the nuts.

The nut A is made of flat or rectangular bars of metal, *a*, coiled close upon each other similar to a spring. The bar should be of such a thickness that the desired depth of the nut should consist of at least two or three coils. The outside of the coils forming the nut can be cut or forged in the usual desired shape, either square or six-sided. These coils or the nut is then tapped a little smaller in diameter than the diameter of the screw-thread cut on the bolt. When the nut is screwed upon the bolt the coils must expand a little to allow the screw-thread of the bolt to enter the nut, and will then bind or clip tightly the thread on the bolt for the whole depth of the nut, giving no play between the thread in the nut and the thread on the bolt, and prevent thereby every possibility of the nut shaking loose.

In Fig. II the depth of the nut A' is increased by one or more extra coils, forming a continuation of the coils which form the main part of the nut, and forming the bottom of the nut. These additional coils *a'* are recessed or bored out larger than the outside diameter of the bolt, as shown at *n*, and form a substitute for a spring-washer between the bottom of the nut and the material, by the opening of these coils when the nut is not screwed down quite tight, as is represented in Fig. IV.

I do not claim a split or divided threaded plain circular spring-ring; but

What I claim as my invention, and desire to secure by Letters Patent, is—

A nut composed of two or more coils of a rectangular bar of metal, coiled similar to a spring, having its screw-thread cut of less diameter than the thread on the bolt, and provided or not with an enlarged recess, *n*, below the screw-thread, substantially as and for the purpose hereinbefore set forth.

STEPHEN W. BALDWIN.

Witnesses:
HENRY E. ROEDER,
JAMES P. HYDE.